(12) United States Patent
Leah et al.

(10) Patent No.: US 7,287,234 B2
(45) Date of Patent: Oct. 23, 2007

(54) METHODS, SYSTEMS AND COMPUTER PROGRAM PRODUCTS FOR USE OF COLOR SATURATION TO HIGHLIGHT ITEMS IN A TREE MAP VISUALIZATION

(75) Inventors: Robert Leah, Cary, NC (US); Kenneth Parzygnat, Raleigh, NC (US); Robert Uthe, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 575 days.

(21) Appl. No.: 10/665,749

(22) Filed: Sep. 19, 2003

(65) Prior Publication Data
US 2005/0066277 A1 Mar. 24, 2005

(51) Int. Cl.
G06F 3/048 (2006.01)
G09G 5/02 (2006.01)

(52) U.S. Cl. .................. 715/853; 715/765; 715/803; 715/821; 345/589

(58) Field of Classification Search ................ 715/700, 715/705, 708, 712–713, 730, 764, 767, 788, 715/853–855, 962; 345/440, 589
See application file for complete search history.

(56) References Cited

U.S. PATENT DOCUMENTS

| | | | |
|---|---|---|---|
| 5,515,487 A | 5/1996 | Beaudet et al. ............. 395/140 |
| 5,570,460 A | 10/1996 | Ramanujam ................ 395/124 |
| 5,577,188 A | 11/1996 | Zhu ........................... 395/326 |
| 5,581,797 A * | 12/1996 | Baker et al. ................. 715/708 |
| 5,786,820 A | 7/1998 | Robertson ................... 345/357 |
| 5,917,492 A | 6/1999 | Bereiter et al. ............. 345/357 |
| 5,950,168 A | 9/1999 | Simborg et al. ............... 705/3 |
| 6,055,515 A | 4/2000 | Consentino et al. .......... 705/27 |
| 6,101,279 A | 8/2000 | Nguyen et al. ............. 382/240 |
| 6,104,400 A | 8/2000 | Halachmi et al. ........... 345/356 |
| 6,151,024 A | 11/2000 | Alimpich et al. ........... 345/357 |
| 6,151,595 A | 11/2000 | Pirolli et al. .................. 707/1 |
| 6,211,880 B1 | 4/2001 | Impink, Jr. ................. 345/418 |
| 6,216,134 B1 | 4/2001 | Heckerman et al. ........ 707/104 |
| 6,278,464 B1 | 8/2001 | Kohavi et al. .............. 345/440 |
| 6,281,896 B1 | 8/2001 | Alimpich et al. ........... 345/340 |
| 6,297,824 B1 | 10/2001 | Hearst et al. ............... 345/357 |
| 6,301,579 B1 | 10/2001 | Becker ....................... 707/102 |

(Continued)

FOREIGN PATENT DOCUMENTS

WO WO 01/08053 A2 2/2001

OTHER PUBLICATIONS

Ben Shneiderman, Treemaps for space-constrained visualization of hierarchies, http://www.cs.umd.edu/hcil/treemap-history/index.shtml, (1998-2006).*

(Continued)

*Primary Examiner*—Stephen Hong
*Assistant Examiner*—Samir Termanini
(74) *Attorney, Agent, or Firm*—Stevens & Showalter LLP

(57) ABSTRACT

Data from a data set is displayed as a tree map visualization by identifying data elements in the data set to be highlighted and generating a tree map visualization based on the data set where a location of bounding boxes corresponding to the identified data elements have greater color saturation in comparison to other bounding boxes.

12 Claims, 5 Drawing Sheets

U.S. PATENT DOCUMENTS

| | | | | |
|---|---|---|---|---|
| 6,307,573 | B1 | 10/2001 | Barros | 345/764 |
| 6,314,424 | B1 | 11/2001 | Kaczmarski et al. | 707/10 |
| 6,341,280 | B1 | 1/2002 | Glass et al. | 707/3 |
| 6,348,935 | B1 | 2/2002 | Malacinski et al. | 345/853 |
| 6,373,484 | B1 | 4/2002 | Orell et al. | 345/420 |
| 6,380,937 | B1 | 4/2002 | Dong et al. | 345/440 |
| 6,380,957 | B1 | 4/2002 | Banning | 345/828 |
| 6,448,985 | B1 | 9/2002 | McNally | 345/784 |
| 6,466,918 | B1 | 10/2002 | Spiegel et al. | 705/27 |
| 6,470,383 | B1 | 10/2002 | Leshem et al. | 709/223 |
| 6,489,968 | B1 | 12/2002 | Ortega et al. | 345/713 |
| 6,583,794 | B1 * | 6/2003 | Wattenberg | 715/708 |
| 2003/0200347 | A1 | 10/2003 | Weitzman | 709/310 |
| 2004/0088678 | A1 | 5/2004 | Litoiu et al. | 717/104 |
| 2004/0168115 | A1 * | 8/2004 | Bauernschmidt et al. | 715/500 |
| 2004/0212615 | A1 | 10/2004 | Uthe | 345/440 |
| 2004/0212616 | A1 | 10/2004 | Uthe | 345/440 |
| 2004/0263513 | A1 * | 12/2004 | Smith et al. | 345/440 |

OTHER PUBLICATIONS

Screen Capture of activequote.fidelity.com/rtmews/market_map.phtml, copyright 1999-2005, FMR Corp.

Schneiderman, Ben, "Tree Visualization with Tree-Maps: 2-d Space Filling Approach," *ACM Trans. Graphics*, vol. 11, No. 1, Jan. 1992, pp. 92-99.

Johnson, Brian et al. "Tree-Maps: A Space-Filling Approach to the Visualization of Hiearchical Information Structures," Proceedings: 1991 IEEE Conference on Visualization, Oct. 22-25, 1991, pp. 284-291.

U.S. Appl. No. 10/664,556, filed Sep. 19, 2003, Methods, Systems and Computer Program Products for Intelligent Positioning of Items in a Tree Map Visualization.

U.S. Appl. No. 10/666,704, filed Sep. 19, 2003, Methods, Systems and Compute Program Products for Filtering Content Displayed in a Tree Map Visualization.

Research Disclosure "Tree Navigator—a concept for navigation in big trees", Aug. 2001, pp. 1384-1385.

Dachselt et al.: *Collapsible Cylindrical Trees: A Fast Hierarchical Navigation Technique*, In the Proceedings of the IEEE Symposium on Information Visualization 2001, 8 pages.

Johnson et al.: *Tree-Maps: A Space-Filling Approach to the Visualization of Hierarchal Information Structures*, Power Point Presentation, Feb. 14, 2001, 18 pages.

Keramopolous et al.: *A Format Definition of the Users View (UV) of the Graphical Object Query Language (GOQL)*, In the Proceedings of the Sixth International Conference on Information Visualization (IV '02), 6 pages.

* cited by examiner

METHODS, SYSTEMS AND COMPUTER PROGRAM PRODUCTS FOR USE OF COLOR SATURATION TO HIGHLIGHT ITEMS IN A TREE MAP VISUALIZATION

FIELD OF THE INVENTION

The present invention relates generally to displaying data on a display device. More particularly, the present invention relates to controlling the display of data that is displayed on "tree map" visualizations.

BACKGROUND OF THE INVENTION

As computer technology advances, computing systems have undertaken the management and processing of larger data systems. With data systems ranging from massive standalone databases to vast distributed networks, oftentimes the limiting factor in analyzing the state of a given system rests not with computing resources, but with the human operator. Specifically, though the computing system may aggregate vast quantities of data in near real-time, in many cases, a human being must visualize the compilation of data to draw effective conclusions from the visualization. Yet, the ability of the end user to digest compiled information varies inversely with the amount of data presented to the end user. Where the amount of compiled data becomes excessive, it can be nearly impossible for a human being to adequately analyze the data.

In an effort to address the foregoing difficulties, tree-map visualization methods have been developed. Initially proposed by Brian Johnson and Ben Shneiderman in the paper, Johnson et al., Tree-Maps: A Space-Filling Approach to the Visualization of Hierarchical Information Structures, Dept. of Computer Science & Human-Interaction Laboratory (University of Maryland June 1991), tree-map visualization techniques map "hierarchical information to a rectangular 2-D display in a space-filling manner" in which the entirety of a designated display space is utilized. Additionally, "[i]nteractive control allows users to specify the presentation of both structural (depth bounds, etc.) and content (display properties such as color mappings) information." Tree-map visualization techniques can be compared in a contrasting manner to traditional static methods of displaying hierarchically structured information.

According to conventional static methods, a substantial portion of hierarchical information can be hidden from user view to accommodate the view of the hierarchy itself. Alternatively, the entire hierarchy can be visually represented, albeit vast amounts of display space can be obscured, hence wasted, simply to accommodate the structure without regard to the hierarchical data in the hierarchy itself. In the tree-map visualization technique, however, sections of the hierarchy containing more important information can be allocated more display space while portions of the hierarchy which are deemed less important to the specific task at hand can be allocated less space. More particularly, in operation, tree-maps partition the display space into a collection of rectangular bounding boxes representing the tree structure. The drawing of nodes within the bounding boxes can be entirely dependent on the content of the nodes, and can be interactively controlled. Since the display space size is user controlled, the drawing size of each node varies inversely with the size of the tree, for instance the number of nodes. Thus, trees having many nodes can be displayed and manipulated in a fixed display space, yet still be visible even when dealing with 1 million objects.

FIG. 1 illustrates a conventional tree map display 10. As seen in FIG. 1, a 10 by 10 display grid is filled with bounding boxes 12 through 68 representing the display of a data set containing twenty-nine entries. Data values associated with the twenty-nine entries establish the size of the bounding boxes and the color of the box, as represented by the different cross-hatch patterns illustrated in FIG. 1. Thus, a first data value may establish the size of the bounding box, for example, market capitalization if the data set represents different stocks, and a second data value may establish the color of the bounding box, for example, the change in stock price. Thus, in the example illustrated in FIG. 1, the tree map display 10 is created from the data set of Table 1 below.

TABLE 1

Exemplary Data

| Bounding Box | First Data Value | Second Data Value |
|---|---|---|
| 12 | 20 | 1 (no cross-hatch) |
| 14 | 12 | 4 (diagonal left-right) |
| 16 | 8 | 4 (diagonal left-right) |
| 18 | 8 | 1 (no cross-hatch) |
| 20 | 8 | 4 (diagonal left-right) |
| 22 | 6 | 1 (no cross-hatch) |
| 24 | 6 | 3 (diagonal right-left) |
| 26 | 4 | 3 (diagonal right-left) |
| 28 | 4 | 3 (diagonal right-left) |
| 30 | 4 | 2 (vertical cross-hatch) |
| 32 | 2 | 1 (no cross-hatch) |
| 34 | 1 | 4 (diagonal left-right) |
| 36 | 1 | 1 (no cross-hatch) |
| 38 | 1 | 1 (no cross-hatch) |
| 40 | 1 | 3 (diagonal right-left) |
| 42 | 1 | 1 (no cross-hatch) |
| 44 | 1 | 4 (diagonal left-right) |
| 46 | 1 | 2 (vertical cross-hatch) |
| 48 | 1 | 1 (no cross-hatch) |
| 50 | 1 | 4 (diagonal left-right) |
| 52 | 1 | 2 (vertical cross-hatch) |
| 54 | 1 | 3 (diagonal right-left) |
| 56 | 1 | 1 (no cross-hatch) |
| 58 | 1 | 1 (no cross-hatch) |
| 60 | 1 | 4 (diagonal left-right) |
| 62 | 1 | 3 (diagonal right-left) |
| 64 | 1 | 3 (diagonal right-left) |
| 66 | 1 | 1 (no cross-hatch) |
| 68 | 1 | 2 (vertical cross-hatch) |

A further example of the use of a tree map visualization is provided by Fidelity Investments' map of the stock market. In the Fidelity market map, the market is divided into sectors and the sectors are populated with bounding boxes far individual stocks. The size of the bounding boxes is based on the market capitalization of the stock and the color of the boxes are based on the price activity of the stock.

SUMMARY OF THE INVENTION

Embodiments of the present invention provide for displaying data from a data set as a tree map visualization by identifying data elements in the data set to be highlighted and generating a tree map visualization based on the data set where a location of bounding boxes corresponding to the identified data elements have greater color saturation in comparison to other bounding boxes.

In particular embodiments of the present invention, generating a tree map visualization includes increasing color saturation of bounding boxes of identified elements.

In additional embodiments of the present invention, generating a tree map visualization includes decreasing color saturation of bounding boxes of elements that are not identified.

In further embodiments of the present invention, identifying data elements in the data set to be highlighted is provided by identifying data elements based on a data value of the data elements that is not utilized in generating the tree map. Identifying data elements in the data set to be highlighted could also be provided by identifying data elements based on metadata associated with the data elements. The identification of data elements in the data set to be highlighted may also be based on a statically defined and/or dynamically determined criteria.

In yet other embodiments of the present invention, a tree map visualization displayed on a display device includes a plurality of bounding boxes. Each of the bounding boxes has a color associated therewith, the color being based on a data value associated with a corresponding bounding box. At least one bounding box has a color saturation greater than a color saturation of another of the plurality of bounding boxes that has the same color as the at least one bounding box so as to highlight the at least one bounding box.

The at least one bounding box may correspond to a predefined element of a data set used to generate the tree map visualization. The at least one bounding box may correspond to an element of a data set used to generate the tree map visualization that is dynamically selected based on data associated with the element that is not used to generate a size or color of a bounding box of the tree map visualization.

As will further be appreciated by those of skill in the art, while described above primarily with reference to method aspects, the present invention may be embodied as methods, apparatus/systems and/or computer program products.

DETAILED DESCRIPTION OF THE INVENTION

Figure 1:
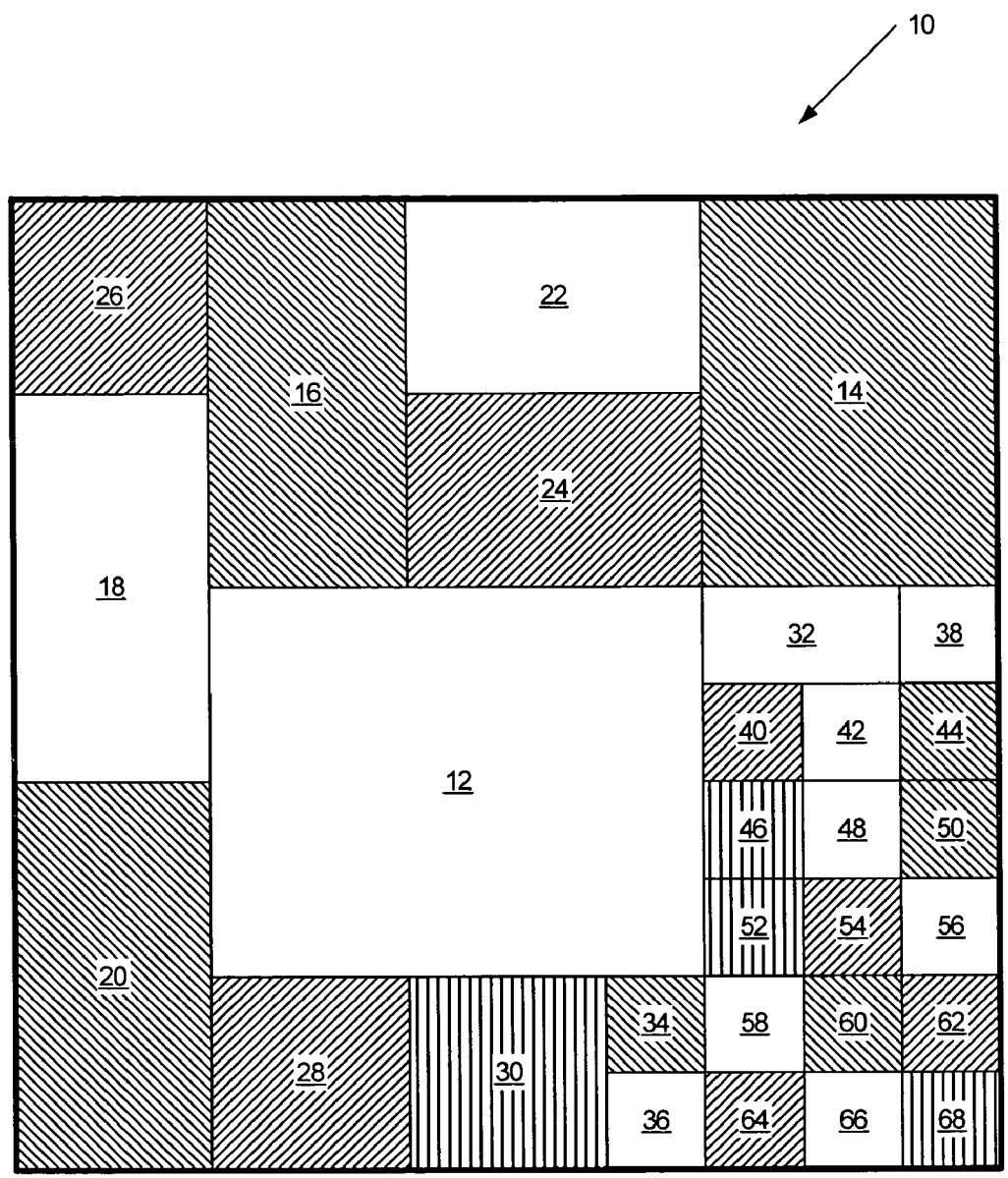
FIG. 1 is an illustration of the display of a set of data utilizing a conventional tree map.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described in part below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Embodiments of the present invention provide for displaying data in tree map format on an electronic display by highlighting data through control of the color saturation of the bounding boxes associated with the data. Such highlighting through color saturation may provide a mechanism so as to add additional information to the display of the data so as to allow a user to more readily assess the information displayed. The highlighting criteria may be based on user selection of the data, the data itself, associated data, a characteristic of the data itself and/or may be provided as metadata.

Figure 2:
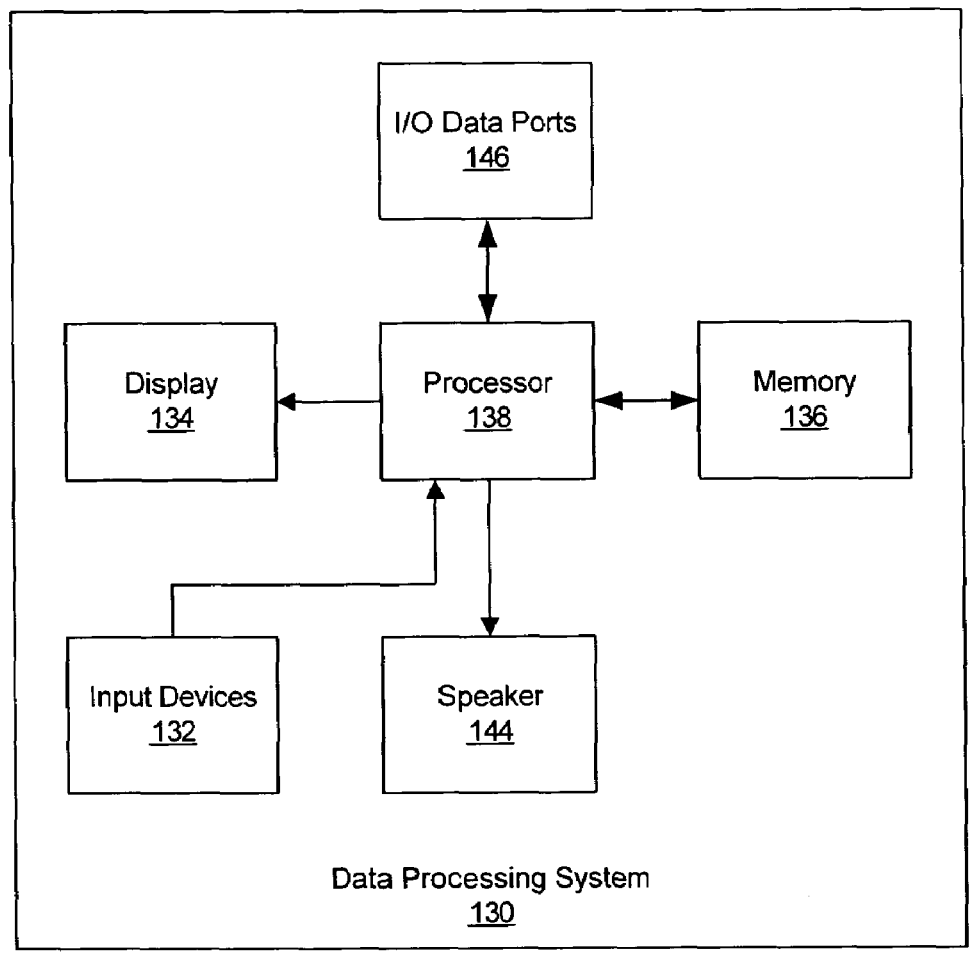
FIG. 2 is a block diagram of a data processing system suitable for use in embodiments of the present invention.

Various embodiments of the present invention will now be described with reference to the figures. FIG. 2 illustrates an exemplary embodiment of a data processing system 130 suitable for a server and network traffic associated with the replicated server in accordance with embodiments of the present invention. The data processing system 130 typically includes input device(s) 132 such as a keyboard, pointer, mouse and/or keypad, a display 134, and a memory 136 that communicate with a processor 138. The data processing system 130 may further include a speaker 144, and an I/O data port(s) 146 that also communicate with the processor 138. The I/O data ports 146 can be used to transfer information between the data processing system 130 and another computer system or a network. These components may be conventional components, such as those used in many conventional data processing systems, which may be configured to operate as described herein.

Figure 3:
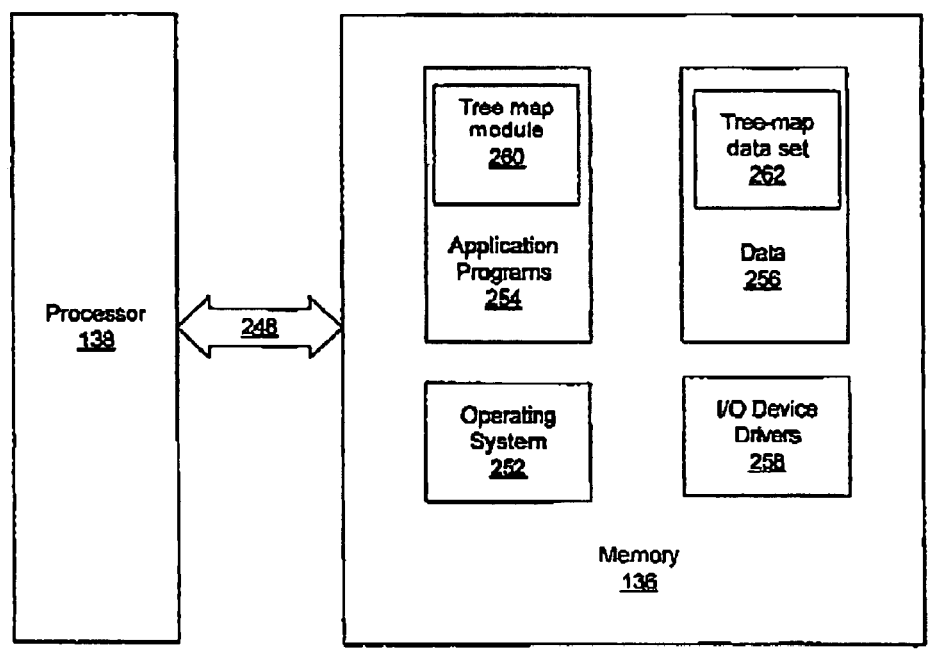
FIG. 3 is a more detailed block diagram of aspects of a data processing system that may be used in embodiments of the present invention.

FIG. 3 is a block diagram of data processing systems that illustrates systems, methods, and computer program products in accordance with embodiments of the present invention. The processor 138 communicates with the memory 136 via an address/data bus 248. The processor 138 can be any commercially available or custom microprocessor. The memory 136 is representative of the overall hierarchy of memory devices, and may contain the software and data used to implement the functionality of the data processing system 130. The memory 136 can include, but is not limited to, the following types of devices: cache, ROM, PROM, EPROM, EEPROM, flash memory, SRAM, and DRAM.

As shown in FIG. 3, the memory 136 may include several categories of software and data used in the data processing system 130: the operating system 252; the application programs 254; the input/output (I/O) device drivers 258; and the data 256, which may include hierarchical data sets. As will be appreciated by those of skill in the art, the operating system 252 may be any operating system suitable for use with a data processing system, such as OS/2, AIX or System390 from International Business Machines Corporation, Armonk, N.Y., Windows95, Windows98, Windows2000 or WindowsXP from Microsoft Corporation, Redmond, Wash., Unix or Linux. The P/O device drivers 258 typically include software routines accessed through the operating system 252 by the application programs 254 to communicate with devices such as the I/O data port(s) 146 and certain memory 136 components. The application programs 254 are illustrative of the programs that implement the various features of the data processing system 130 and preferably include at least one application that supports operations according to embodiments of the present invention. Finally, the data 256 represents the static and dynamic data used by the application programs 254, the operating system 252, the I/O device drivers 258, and other software programs that may reside in the memory 136.

As is further seen in FIG. 3, the application programs 254 may include a tree map module 260. The tree map module 260 may carry out the operations described herein for displaying a tree map diagram of a data set, such as the tree map data set 262. While the present invention is illustrated, for example, with reference to the tree map module 260 being an application program in FIG. 3, as will be appreciated by those of skill in the art, other configurations may also be utilized. For example, the tree map module 260 may also be incorporated into the operating system 252, the I/O device drivers 258 or other such logical division of the data processing system 130. Thus, the present invention should not be construed as limited to the configuration of FIG. 3 but encompasses any configuration capable of carrying out the operations described herein.

One difficulty with tree map visualizations is that the tree map is created so as to utilize all of the available display area. As such, the location of bounding boxes in the tree map is typically established without reference to the nature of the underlying data. The bounding boxes are typically arranged to utilize all of the available display area. Accordingly, the location of items of interest to a user may change from map to map and related and/or important items may be spread out in the map depending on the distribution of bounding boxes that utilizes all of the available display area.

Embodiments of the present invention provide display of data elements of a tree map visualization utilizing color saturation to highlight selected data elements. For example, selected data elements of the data set of Table 1 may be highlighted in the tree map visualization. The selection of data elements to highlight may be automatic and/or user specified. For example, the selection of data elements to highlight may be based on the data itself, for example, increasing or decreasing data value, may be determined based on data associated with the data for display, may be based on a characterization and/or classification of the nature of the data being displayed and/or may be specified as a separate value.

Figure 4:
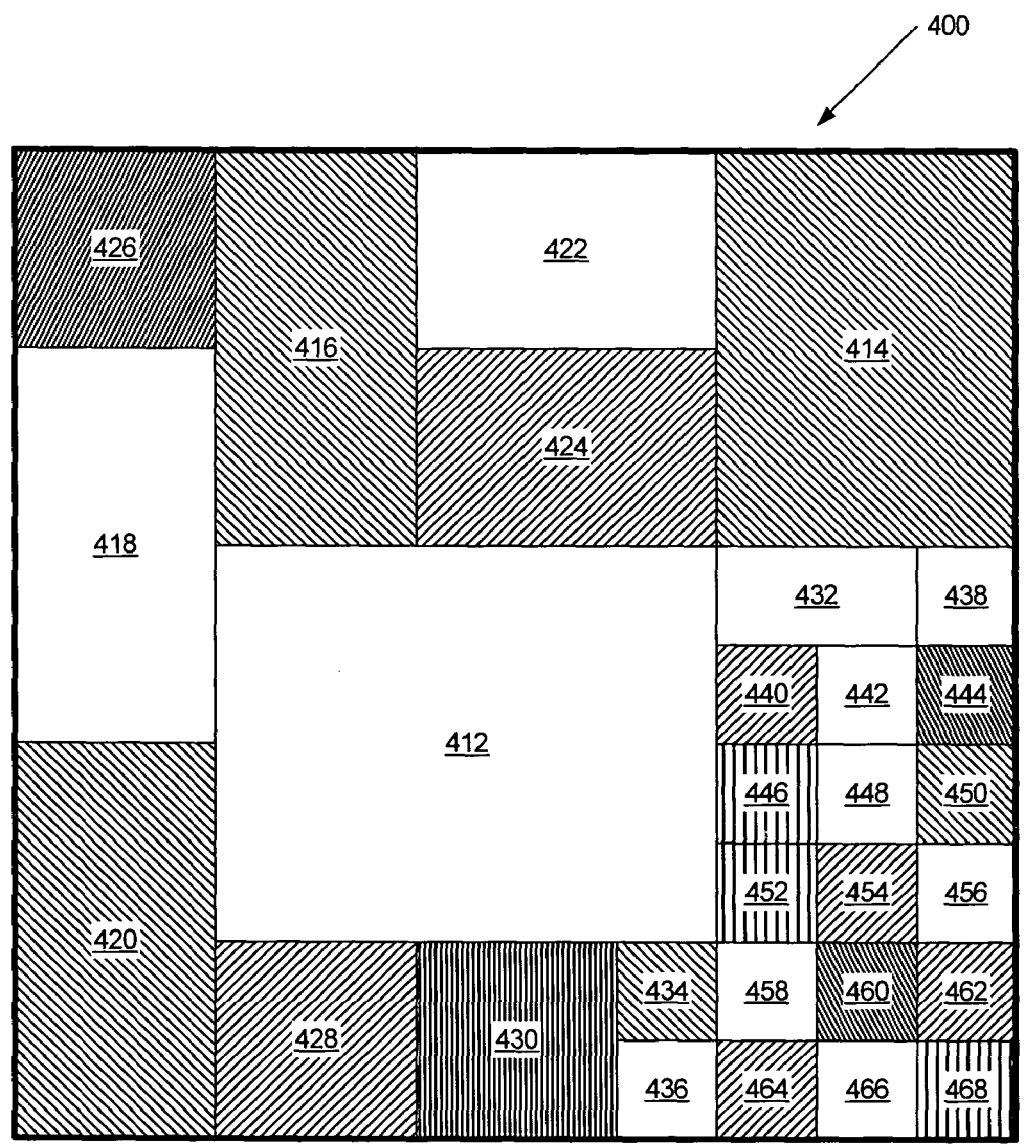
FIG. 4 is an illustration of the display of a set of data of FIG. 1 utilizing a tree map according to embodiments of the present invention.

Returning to the example of Table 1, data elements of Table 1 may be selected for highlighting. For example, data elements 26, 30, 44 and 60 may be selected for highlighting. FIG. 4 is a tree map visualization that is generated based on the first and second data values of Table 1 and with the bounding boxes corresponding to the data elements 26, 30, 44 and 60 highlighted by altering color saturation.

In FIG. 4, the reference numerals of the bounding boxes 412 to 468 correspond to those of FIG. 1 increased by 400. Thus, for example, the bounding box 412 corresponds to the bounding box 12 of FIG. 1, the bounding box 414 corresponds to the bounding box 14 of FIG. 1, etc. As seen in FIG. 4, in comparison to FIG. 1 the bounding boxes 426, 430, 444 and 460 have an increased density of cross hatching to indicate that the color saturation of these boxes is greater than corresponding boxes that are not to be highlighted. Note that the color of the bounding boxes does not change. Thus, the information provided by the color of a bounding box may still be provided. However, a third characteristic of the data may be provided through the use of color saturation. Utilizing the tree map 400 of FIG. 4, a user may quickly ascertain the location of items of interest based on the color saturation of those items.

While FIG. 4 illustrates selected items having an increased color saturation, in additional embodiments of the present invention, the color saturation may be decreased for non-selected bounding boxes. Alternatively, a multiple tiered highlighting approach may be provided where the level of color saturation is decreased, unchanged or increased.

Figure 5:
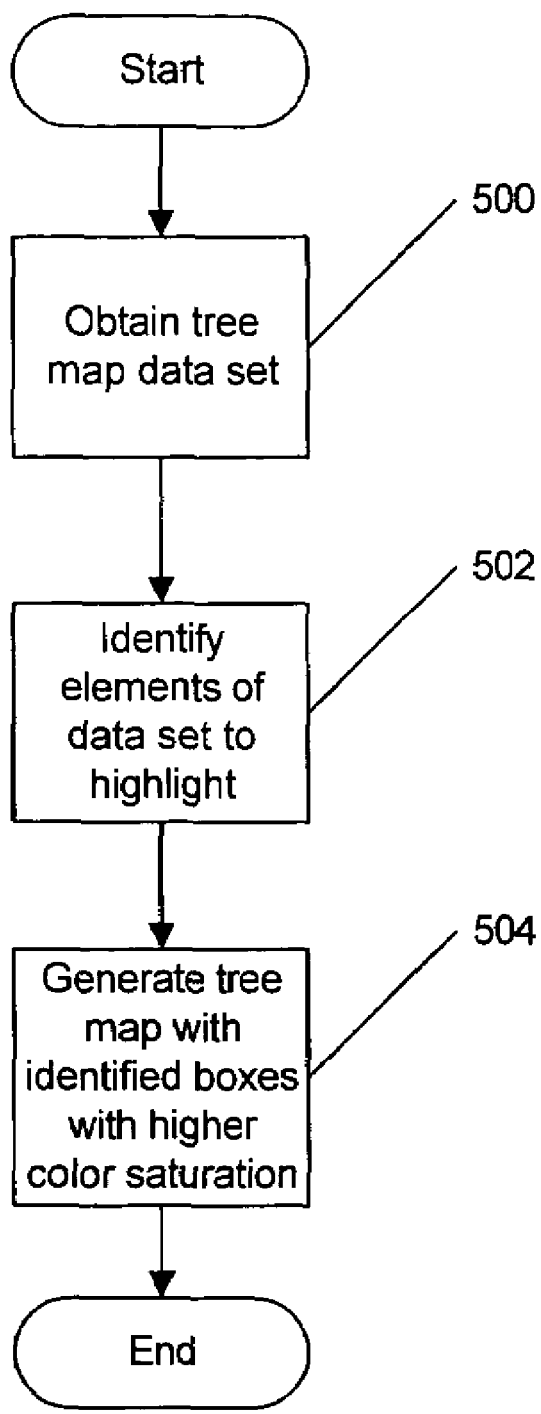
FIG. 5 is a flowchart illustrating operations according to embodiments of the present invention.

FIG. 5 is a flowchart illustration that depicts operations for highlighting data elements displayed in a tree map visualization pursuant to embodiments of the present invention. As shown in FIG. 5, a data set of tree map data is obtained (block 500). The data elements in the tree map data set for which highlighting is desired are identified (block 502). The tree map is then generated such that the bounding boxes of the identified elements of the data set have an increased color saturation over other bounding boxes in the tree map visualization (block 504).

The criteria for identifying the data elements from the tree map data set may be user specified and/or based on a statically and/or dynamically defined criteria. The data elements may be identified based on any suitable analysis of the data, for example, the data elements may be identified based on a series of threshold values. The selection criteria may be statically set, user specified and/or dynamically determined. The dynamic determination of a selection criteria may be provided based on an evaluation of the data values. For example, the selection criteria may be dynamically set based on an evaluation of the data set.

As mentioned above, the selection of an element of the data set may be based on the values of data that is displayed in the tree map, data associated with the data that is displayed in the tree map and/or metadata associated with the tree map data set. In the first instance, the data may be selected based on one or more of the data values that are used in generating the tree map. For instance, in the stock market example, the data elements may be selected based on price change.

The data elements could also be selected based on additional data associated with the data that generates the tree map. For instance, in the stock market example, the data elements may be selected based on stock market activity where the highlighting is based on trading activity of a stock.

The data elements could also be selected based on metadata (i.e. data about the data) associated with the data set that generates the tree map. For example, the data elements could be selected based on deviation from a standard or average of values of the data in the data set. Similarly, the metadata may directly indicate the selection of a data element. For instance, in the stock market example, stocks owned by a user and/or tracked by the user could be identified and selected based on whether a stock was owned, tracked and/or not prioritized.

The flowcharts and block diagrams of FIGS. 2, 3 and 5 illustrate the architecture, functionality, and operation of possible implementations of systems, methods and computer program products for selectively controlling tree map graphical user interfaces according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be understood that each block of the block diagrams and/or flowchart illustrations, and combinations of blocks in the block diagrams and/or flowchart illustrations, can be implemented by special purpose hardware-based systems which perform the specified functions or acts, or combinations of special purpose hardware and computer instructions.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A method of displaying data from a data set as a tree map visualization, comprising:

identifying data elements in the data set to be highlighted; and generating a tree map visualization based on the data set where the tree map visualization comprises a plurality of bounding boxes, each bounding box having a size corresponding to a first characteristic of the data set and a color corresponding to a second characteristic of the data set; and indicating a location of select bounding boxes corresponding to the identified data elements in the data set to be highlighted so as to provide a third characteristic that does not change the color of the select bounding boxes;

wherein the location of the select bounding boxes is indicated by displaying the select bounding boxes as having a greater color saturation in comparison to the saturation of the remainder of the bounding boxes, even if a non-selected bounding box may otherwise have the same color as a corresponding selected bounding box so as to preserve the display of the first, second and third characteristics in the tree map visualization corresponding to the identified data elements.

2. The method of claim 1, wherein generating a tree map visualization comprises increasing color saturation of bounding boxes of identified elements.

3. The method of claim 1, wherein generating a tree map visualization comprises decreasing color saturation of bounding boxes of elements that are not identified.

4. The method of claim 1, wherein identifying data elements in the data set to be highlighted comprises identifying data elements based on a data value of the data elements that is not utilized in generating the tree map.

5. The method of claim 1, wherein identifying data elements in the data set to be highlighted comprises identifying data elements based on metadata associated with the data elements.

6. The method of claim 1, wherein identifying data elements in the data set to be highlighted is based on a dynamically determined criteria.

7. The method of claim 1, wherein identifying data elements in the data set to be highlighted is based on a statically defined criteria.

8. A system for displaying a tree map visualization, comprising:

a display device;

a processor that communicates with said display and executes a tree map module so as to generate on said display device, a plurality of bounding boxes, each bounding box having a size corresponding to a first characteristic of a data set and a color corresponding to a second characteristic of the data set; and at least one bounding box having a color saturation greater than a color saturation of another of the plurality of bounding boxes that has the same color as the at least one bounding box so as to highlight the at least one bounding box so as to provide a third characteristic of the data set and to preserve the display of the first, second and third characteristics in the tree map visualization corresponding to the at least one bounding box.

9. The tree map of claim 8, wherein the at least one bounding box corresponds to a predefined element of a data set used to generate the tree map visualization.

10. The tree map of claim 8, wherein the at least one bounding box corresponds to an element of a data set used to generate the tree map visualization that is dynamically selected based on data associated with the element that is not used to generate a size or color of a bounding box of the tree map visualization.

11. A system including a processor for displaying data from a data set as a tree map visualization, comprising:
  a first component that identifies data elements in the data set to be highlighted; and
  a second component that generates a tree map visualization based on the data set where the tree map visualization comprises a plurality of bounding boxes, each bounding box having a size corresponding to a first characteristic of the data set and a color corresponding to a second characteristic of the data set; and
  a third component that indicates a location of select bounding boxes corresponding to the identified data elements in the data set to be highlighted so as to provide a third characteristic that does not change the color of the select bounding boxes;
  wherein the select bounding boxes is displayed as having a greater color saturation in comparison to the saturation of the remainder of the bounding boxes, even if a non-selected bounding box may otherwise have the same color as a corresponding selected bounding box so as to preserve the display of the first, second and third characteristics in the tree map visualization corresponding to the identified data elements.

12. A computer program product embodied on a computer readable media having computer readable program code therein for displaying data from a data set as a tree map visualization, comprising:
  computer readable program code configured to identify data elements in the data set to be highlighted; and
  computer readable program code configured to generate a tree map visualization based on the data set where the tree map visualization comprises a plurality of bounding boxes, each bounding box having a size corresponding to a first characteristic of the data set and a color corresponding to a second characteristic of the data set; and
  computer readable program code configured to indicate a location of select bounding boxes corresponding to the identified data elements in the data set to be highlighted so as to provide a third characteristic that does not change the color of the select bounding boxes;
  wherein the location of the select bounding boxes is indicated by displaying the select bounding boxes as having a greater color saturation in comparison to the saturation of the remainder of the bounding boxes, even if a non-selected bounding box may otherwise have the same color as a corresponding selected bounding box so as to preserve the display of the first, second and third characteristics in the tree map visualization corresponding to the identified data elements.

* * * * *